May 10, 1960  P. J. MILLER  2,936,019
APPARATUS FOR PRODUCING TUBE BENDS
Filed Sept. 10, 1956  3 Sheets-Sheet 1
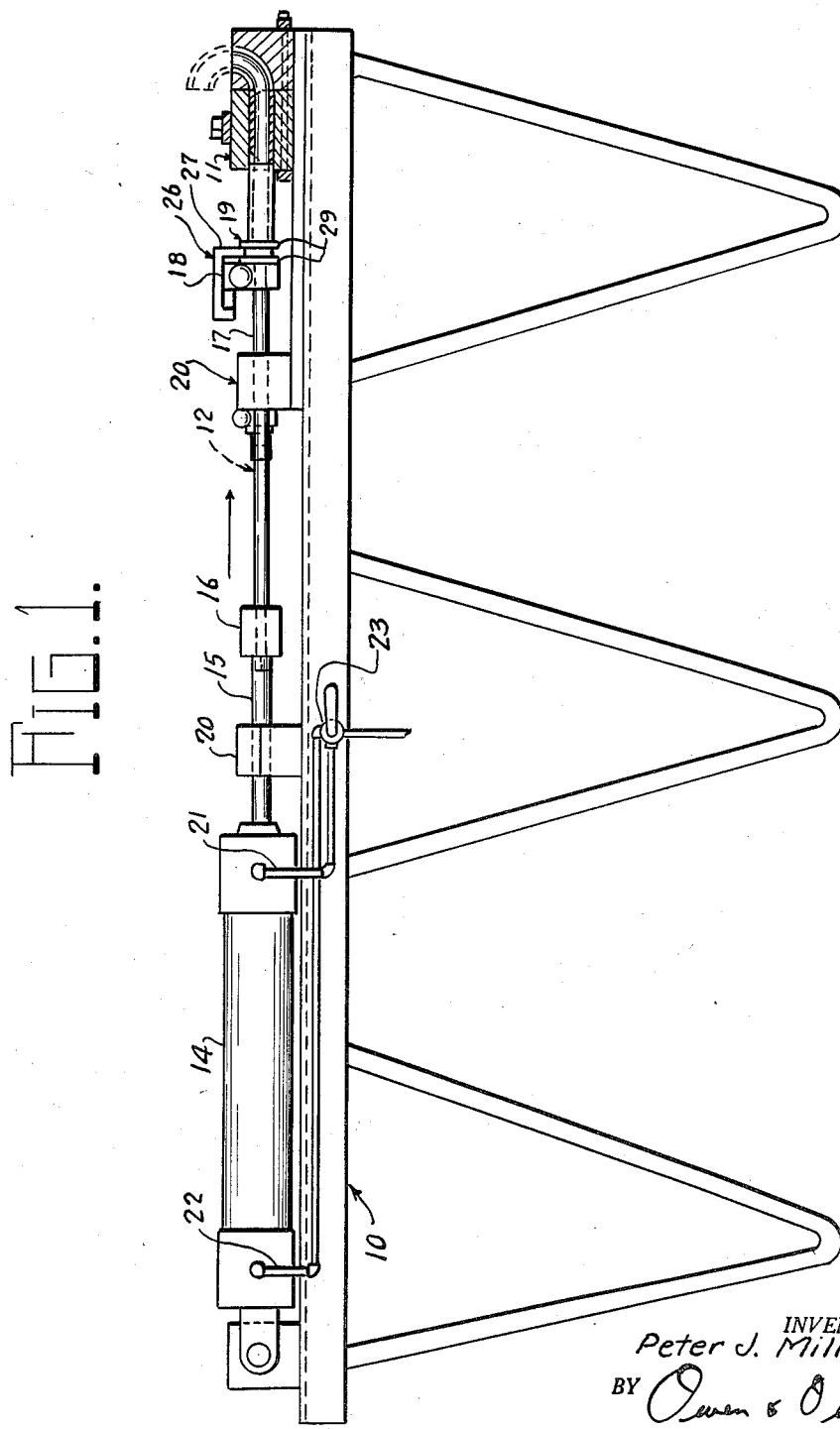
INVENTOR.
Peter J. Miller
BY Owen & Owen
ATTORNEYS

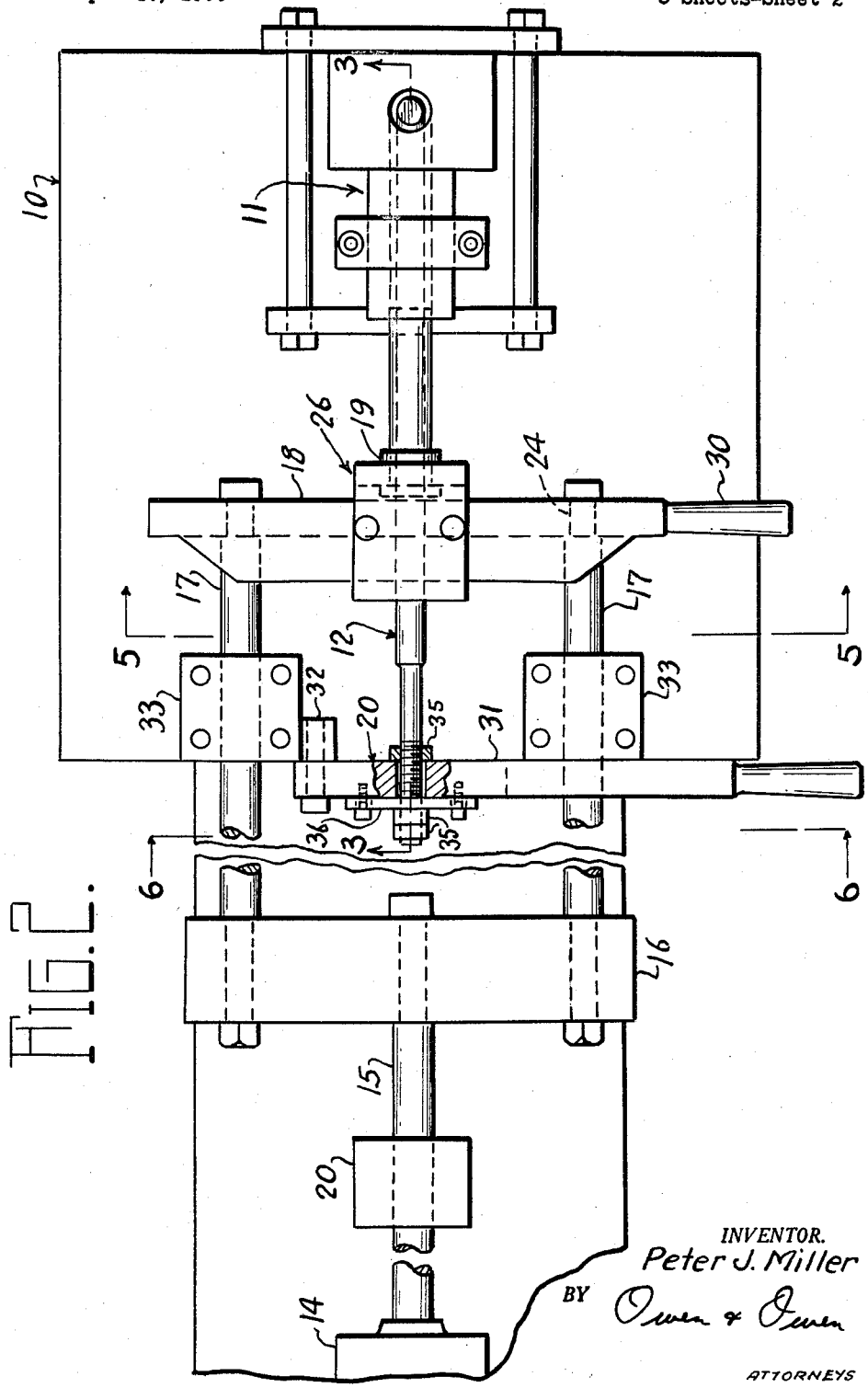

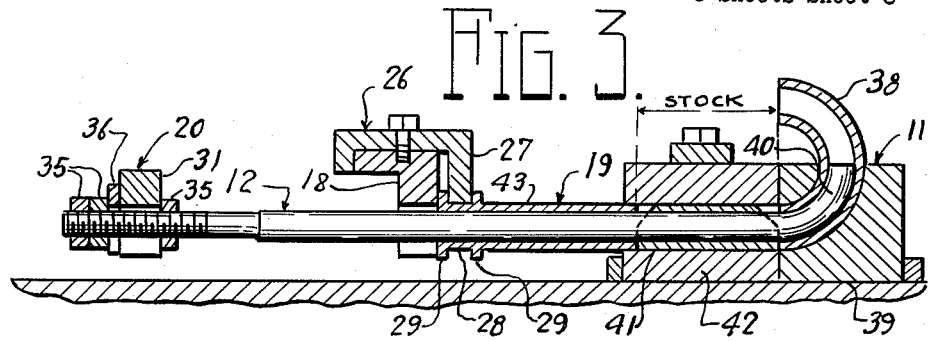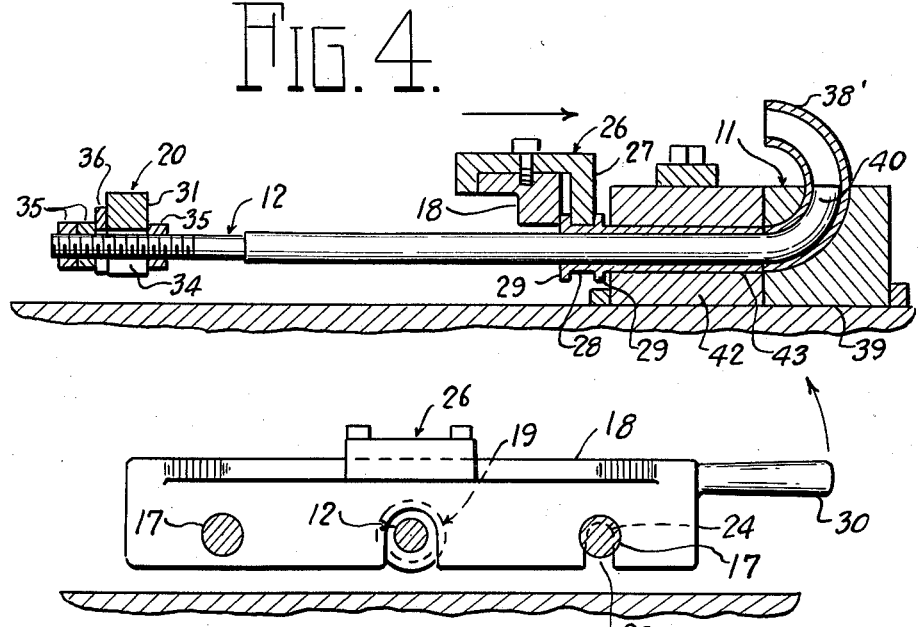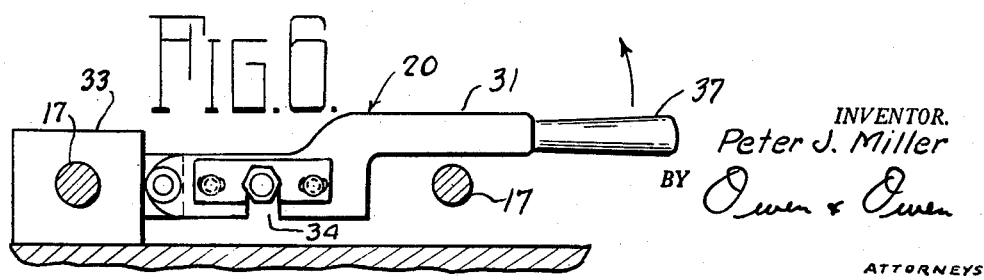

United States Patent Office 2,936,019
Patented May 10, 1960

2,936,019

APPARATUS FOR PRODUCING TUBE BENDS

Peter J. Miller, Toledo, Ohio, assignor to Toledo Heater Company, Toledo, Ohio, a corporation of Ohio Application September 10, 1956, Serial No. 608,907

2 Claims. (Cl. 153—48)

This invention relates to apparatus for producing tube bends, and more particularly, to apparatus of such type which is capable of producing tube bends wherein the outer wall, or wall of greater radius, is not appreciably thinned by the bending operation.

Various suggestions have heretofore been made for producing tube bends, and have been comparatively satisfactory in instances where thinning of the outer tube wall of the bend can be tolerated. Tube bends have been produced by inserting mandrels in opposed open ends of short tube lengths to prevent tube collapse and pulling the tube length to a desired shape around an exterior form. It has also been suggested that tube bends can be produced by positioning a flexible mandrel in an appropriate die and forcing a tube length into the die around the mandrel, as well as that a die with no mandrel can be so employed. Apparatus for producing tube bends in any of such ways, however, has been found to cause substantial thinning of the outer wall of the bend relative to the wall thickness of the original tube length from which the bend was fabricated. In some applications, for example in aircraft hydraulic systems, such wall thinning in tube bends has constituted a serious problem, and has necessitated the rejection of high percentages of fittings fabricated from tube bends produced with previously available apparatus.

In one test that is used for aircraft parts fittings made from tube bends are subjected to a pulsating fluid pressure as high as 9000 p.s.i. in some instances. All fittings are tested before installation. Failure under this test of tube bends made with prior art apparatus has usually involved rupture of the outer wall.

The instant invention is based upon the discovery of apparatus for producing tube bends wherein wall thickness of the tubes can be accurately controlled, and wherein any thinning, relative to the wall thickness of the tube length subjected to fabrication, can be avoided.

It is, therefore, an object of the invention to provide improved apparatus for producing tube bends.

Other objects and advantages will be apparent from the description which follows, reference being had to the accompanying drawings, in which—

Fig. 1 is a view in elevation, with some parts sectioned to show details of construction, showing apparatus according to the invention for producing tube bends.

Fig. 2 is a plan view of a part of the apparatus of Fig. 1, shown on an enlarged scale, and with some parts sectioned to show details of construction.

Fig. 3 is a vertical sectional view along the line 3—3 of Fig. 2.

Fig. 4 is a vertical sectional view similar to Fig. 3 showing the relationships of the parts of the apparatus of Fig. 3 after an additional step in the tube bend forming operation.

Fig. 5 is a vertical sectional view along the line 5—5 of Fig. 2 showing details of means for driving a tube length into a die to form a tube bend.

Fig. 6 is a vertical sectional view along the line 6—6 of Fig. 2 showing details of a mandrel supporting means constituting a part of the apparatus.

Referring now in more detail to the drawings, and in particular to Figs. 1 and 2, apparatus according to the invention for producing tube bends is shown mounted on a suitable heavy work table indicated generally at 10. The apparatus comprises a forming die indicated generally at 11; mandrel means indicated generally at 12; means for driving a tube length or blank disposed around the mandrel 12 into the forming die 11, which means includes a hydraulic cylinder 14, a rod 15 driven by a piston in the cylinder, a cross head 16 driven by the rod, a pair of rods 17 driven by the cross head, a swingably releasable cross head 18 driven by the rods 17, and a sleeve 19 which is operably engaged and driven by the releasable cross head and, in turn, bears against and drives a blank disposed around the mandrel 12 into the forming die 11; and anchor means indicated generally at 20 for preventing longitudinal movement of the mandrel means during such driving of a tube length. The rod 15, which can oscillate in a suitable support 20, is rigidly attached to the cross head 16, and can be moved to the left or right, respectively, by admitting hydraulic fluid under pressure to the cylinder 14 through a line 21 or 22 from any suitable source. A manually operated valve 23 is shown in Fig. 1 for directing hydraulic fluid to drive the rod 15 and the cross head 16. The rods 17 extend through and are clamped against the cross head 16, while the releasable cross head 18 is pinned to one of the rods 17, and is engaged in a portion 24 of reduced diameter of the other of the rods 17, which portion is received in a slot 25 in the lower edge of the cross head 18, as can be seen from Figs. 2 and 5. As a consequence, the cross head 18 is anchored to and is driven by the rods 17 when the latter are moved horizontally either to the right or to the left in Figs. 1 and 2 while the reduced diameter rod portion 24 is engaged in the slot 25. As can be seen in Figs. 3, 4 and 5, the mandrel member 12 extends through an opening in the cross head 18, but the face of the sleeve 19 adjacent the cross head 18 is larger than this opening, so that the sleeve is driven to the right with the cross head 18.

A channel-shaped member 26 is attached by threaded retainers to the cross head 18, and has a slot in its forward side wall 27 into which a portion 28 of reduced diameter of the sleeve 19 is received (see Figs. 1, 3 and 4). The portions of the sleeve 19 adjoining the reduced diameter portion 28 constitute two integral rings 29 which bear against the portion of the side wall 27 of the channel member 26 adjacent the slot therein so that the sleeve 19 is withdrawn to the left with the cross head 18.

By virtue of the pivotal and slotted engagement between the yoke 18 and the rods 17, the yoke 18 can be rotated by lifting a handle 30 (see Fig. 5) until the channel member 26 is no longer engaged with the sleeve 19, and the latter is free to slide on the mandrel means 12.

As can be seen in Figs. 2 and 6, the supporting means 20 for the mandrel member 12 comprises an arm 31 pinned to a block 32 which is welded or otherwise rigidly attached to one of two supports 33 in which the rods 17 slide. When the arm 31 is in the position shown in Fig. 6 a slot 34 therein extends downwardly over and around an end of the mandrel member 12, and adjusting nuts 35 which are threaded onto the end of the mandrel member 12 bear against a plate member 36 which is bolted to the arm 31. The arm member 31 thus supports the mandrel member 12 against movement to the right in Fig. 2 when in the position shown therein and in Fig. 6, and is itself anchored against such movement by the supports 33. By lifting a handle 37, in the direction of the arrow in Fig. 6, the arm 31 can be swung out of engagement with the mandrel member 12.

The apparatus is shown in Figs. 1, 2 and 3 ready for a tube bending operation with the rear half of a fabricated tube bend 38 positioned in a forming part 39 of the die 11, surrounding a forming portion 40 of the mandrel member 12. A tube length 41 ready to be fabricated is positioned around the mandrel 12 in a guide block 42, which is a part of the die 11. The next step in the production of tube bends with the apparatus, from the condition shown in these three views, is to operate the valve 23 to admit hydraulic fluid under pressure to the cylinder 14 through the line 22, and thereby to drive the rod 15, cross head 16, rods 17, cross head 18, and sleeve 19 to the right to the position shown in Fig. 4. This movement drives the tube length into the forming part 39 of the die, and thus fabricates it into a tube bend 38' and pushes the tube bend 38 from the die. The valve 23 is then operated to withdraw the entire assembly to the left a sufficient distance that the sleeve 19 clears the die 11. The cross head 18 is then swung out of engagement with the sleeve 19, and the arm 31 is swung out of engagement with the mandrel 12; the sleeve 19 is then moved manually to the left over the mandrel 12, and separated therefrom. A tube length 41 of appropriate size to form, in the die 11, the desired tube bend, is then slipped over the mandrel 12, followed by the sleeve 19, and the arm 31 and the cross head 18 are swung back to the positions shown in Figs. 5 and 6 so that the mandrel 12 is again supported against longitudinal movement, and the cross head 18 is operatively engaged with the rods 17. The valve 23 is then again operated to drive the collar 19 to the right, and, as the apparatus passes through the position illustrated in Figs. 1-3 a new cycle commences, and the workpiece 38' is forced out of the die 11 as the next tube length is fabricated.

As can be seen by reference to Figs. 2, 3 and 4, the mandrel member 12, and particularly the forming portion 40 thereof, is not permanently supported relative to the die 11, and would be free to move both vertically and in one horizontal direction a limited distance in the cavity of the die 11 except for the forces exerted on it by a cylindrical portoin 43 of the sleeve 19 and by work being fabricated. It has been found, however, that such forces, and particularly those exerted by the cylindrical portion 43 of the sleeve 19, adequately anchor the forming part of the mandrel during operation. It will be observed in Fig. 3 that the guide block 42 is so sized relative to a tube length to be fabricated that the cylindrical portion 43 enters the cavity thereof before deformation of the tube length begins. As a consequence, the cylindrical portion of the sleeve supports the forming portion of the mandrel throughout each fabricating step.

It has been found that the walls of the outer radius of tube bends produced in apparatus according to the invention can be made consistently to have substantially uniform thicknesses, which can be substantially the wall thickness of the original tube length, or can be even greater, if desired. A greater thickness is achieved by withdrawing the mandrel member 12 to the left in Fig. 2 by suitable adjustment of the nuts 35.

In a particular instance a die made up of a guide block having a horizontally extending circular opening one inch in diameter and a forming part having an axially aligned, quarter toroidal die opening extending upwardly therefrom with a radius of rotation (of the center of the circle of revolution, which circle had a diameter of one inch) of $^{31}/_{32}$ inch has been employed with a mandrel having a uniform circular cross-section of 0.865 inch and an upturned end so shaped that it is symmetrically positioned relative to the die cavity when its axis coincides with the axis of the die opening have been employed to produce tube bends. Such die and mandrel were used to fabricate aluminum alloy tube lengths having an inside diameter of 0.870 inch and an outside diameter of 1.000 inch. If a part of the upper portion of each end of such a tube length is cut away on approximately a 45° angle, as is shown in Fig. 3, approximately right angular ends result on the tube ends produced. This is not essential, however, as the ends can be cut, after tube bend formation, to any desired angle. By employing such tube lengths approximately 6½ inches long, 180° bends have been produced, as shown in the drawings. Either shorter or longer tube lengths can be used, however, to produce, respectively, smaller or larger angle bends.

It will be apparent that various changes and modifications can be made from the specific details shown in the attached drawings and discussed in connection therewith without departing from the spirit of the attached claims. In one aspect the invention provides apparatus for producing tube bends. Such apparatus comprises, in combination, a die having a forming cavity, mandrel means positioned within the forming cavity of the die, means for driving a tube length longitudinally along the mandrel means and into the cavity of the die, and means for releasably supporting the mandrel means to prevent, in cooperation with forces exerted by the driving means, longitudinal movement of the mandrel means while a tube length is being urged longitudinally thereof into the die cavity.

What I claim is:

1. Apparatus for producing tube bends comprising, in combination, a die having a forming cavity and a guide cavity, mandrel means extending through said guide cavity and through said forming cavity, elongated sleeve means generally cylindrical in cross section for driving a tube length longitudinally along said mandrel means and into the forming cavity of said die, means including a single lever for driving said sleeve means, and swingable between a position operatively associated with, and effective in such position for driving said sleeve means, and a second position out of engagement therewith, and means for releasably supporting said mandrel means to prevent, in cooperation with forces exerted by said driving means, longitudinal movement of said mandrel means while a tube length is being urged longitudinally thereof into said cavity, which supporting means includes a single lever which is swingable to a position out of engagement with said mandrel means.

2. Apparatus for producing tube bends comprising, in combination, a die including a first block having a curved forming cavity and a second block adjacent thereto having a straight guide cavity, said cavities being aligned with one another, a mandrel extending through the guide cavity and through the forming cavity, elongated sleeve means generally cylindrical in cross section adapted to contact the end of a tube length for driving the tube length longituidnally along said mandrel, through said guide cavity, and through said forming cavity, said sleeve means being longer than said guide cavity, means for driving said sleeve means including a single lever swingable between a position operatively associated with, and effective in such position for driving, said sleeve means, and a second position above said sleeve means out of engagement therewith, and a second single lever for releasably supporting said mandrel means to prevent, in cooperation with forces exerted by said driving means, longitudinal movement of said mandrel while a tube length is being urged longitudinally thereof through said cavities, which lever is swingable to a position above said mandrel and out of engagement therewith.

References Cited in the file of this patent

UNITED STATES PATENTS

| | | |
|---|---|---|
| 1,943,700 | Snell | Jan. 16, 1934 |
| 1,956,604 | Williams | May 1, 1934 |

FOREIGN PATENTS

| | | |
|---|---|---|
| 547,714 | Germany | Mar. 29, 1932 |
| 570,251 | Germany | Feb. 13, 1933 |